United States Patent
Lee et al.

(10) Patent No.: US 9,645,381 B2
(45) Date of Patent: May 9, 2017

(54) MULTI-SURFACE OPTICAL 3D MICROSCOPE

(71) Applicant: Zeta Instruments, Inc., San Jose, CA (US)

(72) Inventors: Ken Kinsun Lee, Los Altos, CA (US); Ronny Soetaman, Fremont, CA (US); Zhen Hou, Fremont, CA (US); James Jianguo Xu, San Jose, CA (US); Rusmin Kudinar, Fremont, CA (US); Vamsi Mohan Velidandla, San Jose, CA (US); Ben Garland, Livermore, CA (US)

(73) Assignee: Zeta Instruments, Inc., San Jose, CA (US)

( * ) Notice: Subject to any disclaimer, the term of this patent is extended or adjusted under 35 U.S.C. 154(b) by 48 days.

(21) Appl. No.: 14/691,908

(22) Filed: Apr. 21, 2015

(65) Prior Publication Data
US 2015/0226953 A1    Aug. 13, 2015

Related U.S. Application Data

(63) Continuation of application No. 13/220,595, filed on Aug. 29, 2011, now Pat. No. 9,036,869.

(60) Provisional application No. 61/378,794, filed on Aug. 31, 2010.

(51) Int. Cl.
| | |
|---|---|
| G06K 9/00 | (2006.01) |
| G02B 21/36 | (2006.01) |
| G02B 21/00 | (2006.01) |
| G06K 9/46 | (2006.01) |
| G06T 5/00 | (2006.01) |

(Continued)

(52) U.S. Cl.
CPC ....... *G02B 21/365* (2013.01); *G02B 21/0016* (2013.01); *G02B 21/367* (2013.01); *G06K 9/46* (2013.01); *G06T 5/00* (2013.01); *G06T 7/40* (2013.01); *H04N 5/357* (2013.01); *G06T 2207/10056* (2013.01)

(58) Field of Classification Search
CPC .. G06T 7/40; G06T 7/602; G06T 5/00; G06T 2207/10056; G02B 21/365; G02B 21/367; G02B 21/0016; H04N 5/357; G06K 9/46
See application file for complete search history.

(56) References Cited

U.S. PATENT DOCUMENTS

| | | |
|---|---|---|
| 3,169,459 A | 2/1965 | Friedberg |
| 4,198,571 A | 4/1980 | Sheppard |

(Continued)

OTHER PUBLICATIONS

Yin, Yin, "Multi-surface, multi-object optimal image segmentation: application in 3D knee joint imaged by MR," University of Iowa, Iowa research online, Jul. 2010, pp. 1-110.

*Primary Examiner* — Shefali Goradia
(74) *Attorney, Agent, or Firm* — Bever, Hoffman & Harms, LLP

(57) ABSTRACT

A method of detecting multi-surfaces of an object includes providing an imaging system capable of detecting surfaces of the object. After system parameters are set up, two-dimensional images of the object at multiple Z steps can be acquired. Each surface of the object can then be extracted using two steps. In a first step, the surface can be constructed based on a confidence threshold. In a second step, the surface can be enhanced using an interpolation filter.

11 Claims, 7 Drawing Sheets

(51) Int. Cl.
*H04N 5/357* (2011.01)
*G06T 7/40* (2017.01)

(56) References Cited

U.S. PATENT DOCUMENTS

| | | | |
|---|---|---|---|
| 4,905,170 A * | 2/1990 | Forouhi | G01N 21/17 356/631 |
| 5,022,743 A | 6/1991 | Kino et al. | |
| 5,065,008 A | 11/1991 | Hakamata et al. | |
| 5,886,767 A | 3/1999 | Snook | |
| 6,275,718 B1 * | 8/2001 | Lempert | A61B 3/117 351/219 |
| 6,342,053 B1 * | 1/2002 | Berry | A61F 9/0079 606/10 |
| 6,556,199 B1 | 4/2003 | Fang et al. | |
| 6,756,590 B2 * | 6/2004 | Kazui | G01B 15/08 850/9 |
| 6,838,650 B1 | 1/2005 | Toh | |
| 6,940,507 B2 | 9/2005 | Repin | |
| 7,227,630 B1 | 6/2007 | Zavislan et al. | |
| 7,323,705 B2 | 1/2008 | Haga et al. | |
| 7,348,556 B2 * | 3/2008 | Chitturi | G01B 15/08 250/307 |
| 7,355,702 B2 | 4/2008 | Yamashita | |
| 7,372,985 B2 | 5/2008 | So et al. | |
| 7,671,867 B2 | 3/2010 | Repin | |
| 7,729,049 B2 | 6/2010 | Xu et al. | |
| 7,944,609 B2 | 5/2011 | Xu | |
| 8,374,457 B1 | 2/2013 | Wang | |
| 2004/0164243 A1 * | 8/2004 | Kazui | G01B 15/08 250/310 |
| 2006/0056791 A1 | 3/2006 | Tzschoppe | |
| 2008/0291533 A1 | 11/2008 | Xu et al. | |
| 2010/0134595 A1 | 6/2010 | Xu et al. | |
| 2010/0135573 A1 | 6/2010 | Xu | |
| 2011/0182517 A1 * | 7/2011 | Farsiu | A61B 5/0066 382/190 |

* cited by examiner

MULTI-SURFACE OPTICAL 3D MICROSCOPE

RELATED APPLICATIONS

This application is a continuation of U.S. application Ser. No. 13/220,595, entitled "MULTI-SURFACE OPTICAL 3D MICROSCOPE", filed on Aug. 29, 2011, which application claims priority to U.S. Provisional Application 61/378,794, entitled "MULTI-SURFACE OPTICAL 3D MICROSCOPE", filed on Aug. 31, 2010, and incorporated by reference herein.

BACKGROUND OF THE INVENTION

Field of the Invention

This invention is related to optical three dimensional (3D) measurement techniques, and more particularly to methods of generating and displaying multiple-surface 3D images.

Description of the Related Art

The ability to measure a 3D object accurately and to render a 3D image of it on a two-dimensional (2D) display is very important to a variety of academic and industrial applications. For example, a bio-chip used for DNA sequencing may contain thousands of minute wells partially filled with reagent and sealed with a thin layer of plastic cover. Because reagent is expensive, it is important to measure the fill level inside a well so that reagent waste can be eliminated. The challenge in this case is to accurately profile the many surfaces involved, namely the surface of plastic cover, the top surface of the well, the fluid surface of the reagent, and the bottom surface of the well, and to display the 3D structure and measurement results in a way that is easy to understand.

Over the years, several types of optical based non-destructive measurement systems have been developed to address the aforementioned applications. These systems are typically based on techniques such as confocal microscopy and structured light sources (SLS).

For example, U.S. Pat. No. 4,198,571 issued to Sheppard in 1980 discloses the basic technique of confocal microscopy. U.S. Pat. No. 5,022,743 (Kino) discloses an improved confocal system using a Nipkow disk. U.S. Pat. No. 5,065,008 (Hakamata) describes a confocal system based on laser scanning. U.S. Pat. No. 6,838,650 (Toh) describes an improved high speed and high resolution confocal system for three dimensional measurement. U.S. Pat. No. 7,372,985 (So) discloses a confocal based system and method for volumetric 3D displaying of biological tissue.

Systems based on structured light sources (SLS) offer similar capability to that provided by confocal microscopy. For example, U.S. Pat. No. 7,729,049 (Xu) describes a 3D microscope using one of various SLS techniques.

Both confocal microscopy and SLS 3D measurement systems generate a 3D image by capturing multiple 2D images at a set of Z steps within a Z scan range. In the case of a confocal system, an algorithm based on maximum image intensity is used to determine a surface. In an SLS system, such as the one disclosed in U.S. Pat. No. 7,729,049 (Xu), maximum image contrast is used instead. Because both confocal and SLS systems can image through optically translucent materials, any interior surfaces inside a transparent object can, in principle, be measured. For example, U.S. Pat. No. 7,323,705 (Haga) discloses a method and apparatus to measure liquid volume of small bio-cells by measuring the top surface of the liquid and the bottom of the well. However, Haga only measures an average value for each of the surfaces, and not the 3D profile of the surfaces. U.S. Pat. No. 7,227,630 (Zavislan) discloses a confocal system that can produce vertical sections of a sample by displaying the various internal parts using image intensity values, but does not create an image in the form of extracted surfaces.

In practice, profiling an interior surface of a transparent object is not trivial. For example, it is difficult for an optical 3D measuring system to find the boundary surface between two liquids with similar optical properties. Furthermore, a transparent object could add aberration to the system optics to produce undesirable artifacts. Because of these difficulties, internal surfaces extracted by a conventional 3D measuring system often contain false surfaces and demonstrate various degrees of image distortion. Without effective means for separating between false and valid surfaces, a conventional 3D system will not be able to present the true internal structure of an object.

U.S. Pat. No. 7,372,985 (So) discloses a system combining confocal optics with direct volumetric rendering for imaging tissue samples. The volumetric data generated by this system is a collection of pixel values at a regular XYZ grid obtained by stacking a set of sequentially captured 2D images. In the direct volumetric rendering scheme, stacked 2D image pixel values are directly mapped into 3D. Various segmentation methods have also been suggested to enhance the volume image by separating valid image from noise.

Instead of direct volumetric rendering, U.S. Pat. No. 6,556,199 (Fang) discloses a method and apparatus to convert intensity volume data set into a voxel-based volume representation. A voxel-based (i.e. a volumetric pixel-based) volumetric display of 3D images has been available as a computer infrastructure is well known. For example, U.S. Pat. No. 6,940,507 (Repin) discloses such a volume rendering process with fast rendering time and improved visual image quality. Compared to direct volumetric rendering, voxel-based volumetric rendering offer flexibility in displaying the volume data. For example, it can extract internal surfaces of an object as well as display 2D pixel values in 3D. While a voxel based 3D measurement system may be ideal for viewing biological specimens with many irregular internal parts, it is not optimized for industrial parts that have well-defined internal structures.

For an industrial part, such as a micro-fluidic circuit or a bio-chip, it is highly desirable to view all of its surfaces in one 3D image and to profile these surfaces in precision. The 3D systems that offer direct volumetric rendering do not generate surfaces, so they are of limited utility. Systems that use voxel-based volumetric rendering are not optimized for industrial parts due to their limited surface extraction precision, slow speed of rendering, and lack of interactive surface selection.

Therefore, a need arises for a technique to generate accurate 3D image of an object, to render the object in multi-surface 3D view, and to measure various parameters of these surfaces.

SUMMARY OF THE INVENTION

A method of detecting multi-surfaces of an object is described. In this method, an imaging system capable of detecting surfaces of the object is provided. After system parameters are set up, two-dimensional images at multiple Z steps can be acquired. Using two steps, each surface of the object can then be extracted. In a first step, the surface can be constructed based on a confidence threshold. In a second step, the surface can be enhanced using an interpolation filter.

The system parameters can include at least a number of surfaces, a Z scan step size, a confidence threshold, a start Z scan position, and a Z range of each surface. The imaging system can be a structured light source based imaging system or a confocal imaging system. The confidence threshold and the interpolation filter can be based on one of image contrast values and image intensity values. The interpolation filter can be determined by a filter length as well as an image contrast percentile threshold or an image intensity percentile threshold.

An enhanced surface can include first data points below the confidence threshold and second data points above the confidence threshold. Notably, the second data points generally neighbor the first data points. Therefore, in one embodiment, the first data points can be assigned new contrast and Z profile values, which can be derived from a contrast-weighted average of the second data points. In another embodiment, the first data points can be assigned new contrast and Z profile values, which can be derived from an intensity-weighted average of the second data points.

A method of displaying multi-surfaces of an object is also described. In this method, the opacity of a particular surface of the object can be controlled. The controlling can be determined by an opacity parameter selected by an operator using an interactive software slider bar. Additionally, real surface data can be separated from noise data during the rendering of the particular surface. The separating can be determined by a filter selected by an operator using another interactive software slider bar. The filter can be based on image contrast or intensity.

A method of measuring multi-surfaces of an object is also described. In this method, a plurality of cross-sectional profiles of surfaces of the object can be selected for simultaneous display using a single x-y plot. In one embodiment, selecting can be done using an interactive menu within a graphic user interface. At least one of the cross-sectional profiles can be corrected. The correcting can include converting an apparent thickness of a layer associated with a cross-sectional profile into an actual thickness. For example, the actual thickness of a layer can be computed by multiplying the apparent thickness of the layer by its index of refraction (when known).

Parameters of the object can be computed in this method. The parameters can include at least two of surface thickness, curvature, roughness, and waviness. In one embodiment, the parameters can include an index of refraction.

The plurality of cross-sectional profiles as well as results of the correcting and the calculating can be displayed in this method. The displaying can include providing at least one cursor for the x-y plot. Each cursor can determine the values of a table showing the results for each layer of the object having an associated profile

DETAILED DESCRIPTION OF THE FIGURES

State of the art 3D imaging and measurement techniques are set forth in commonly assigned U.S. Pat. No. 7,729,049 and U.S. Pat. No. 7,944,609, and co-pending U.S. Published Applications 2010/0135573, and 2008/0291533, the contents of which are incorporated herein by reference.

Figure 1A:
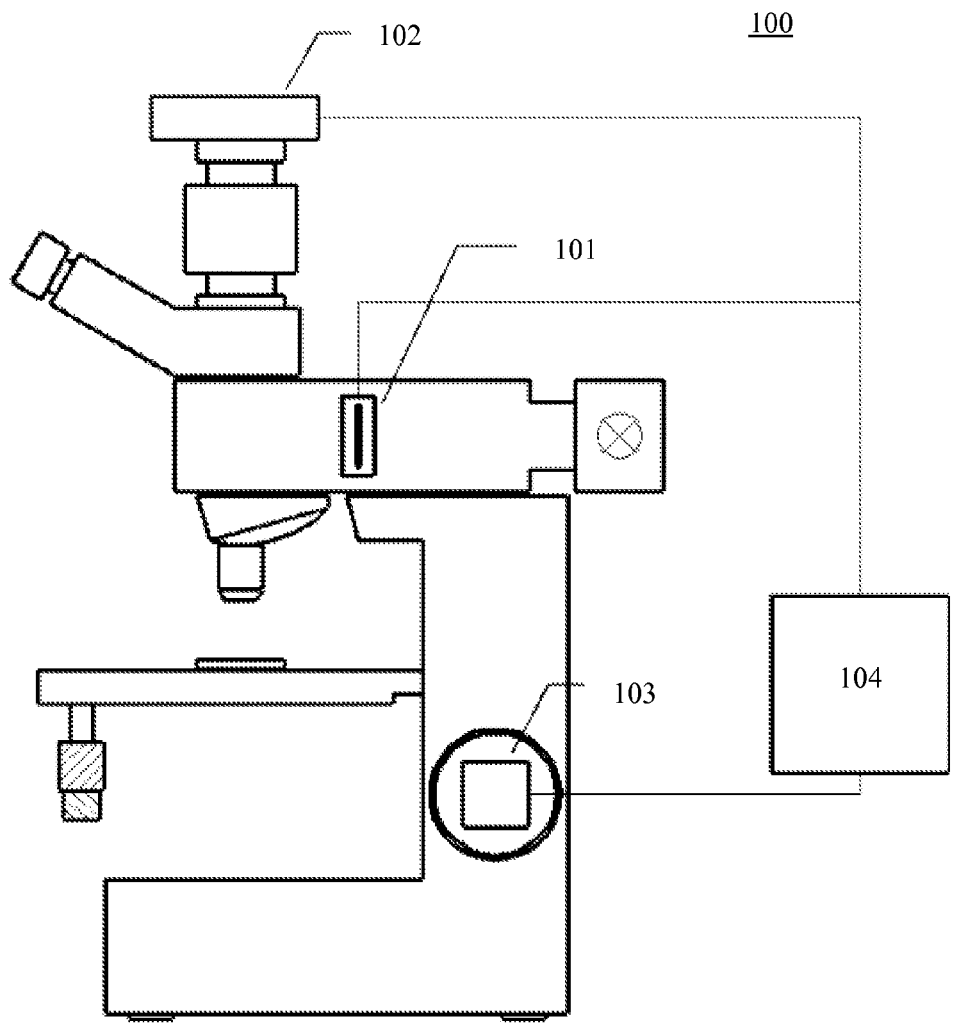
FIG. 1A illustrates an exemplary imaging system including a 3-D optical microscope.

FIG. 1A illustrates an exemplary imaging system 100 including a 3-D optical microscope having a pattern generator 101. Knob 103 can be used for focusing adjustment, which can be adjusted by electrical motor, piezoelectric actuator, or other means. A camera 102 can be used for image acquisition. A processor 104 can be used to control focusing adjustment knob 103, camera 102, and pattern generator 101. Processor 104 can also analyze data and create a 3-D image of the sample. In one embodiment, processor 104 can include a personal computer. Note that imaging system 100 and other structured light source imaging systems that can be used to create a multi-surface 3D image are described in detail in U.S. Pat. No. 7,729,049 (Xu).

Figure 1B:
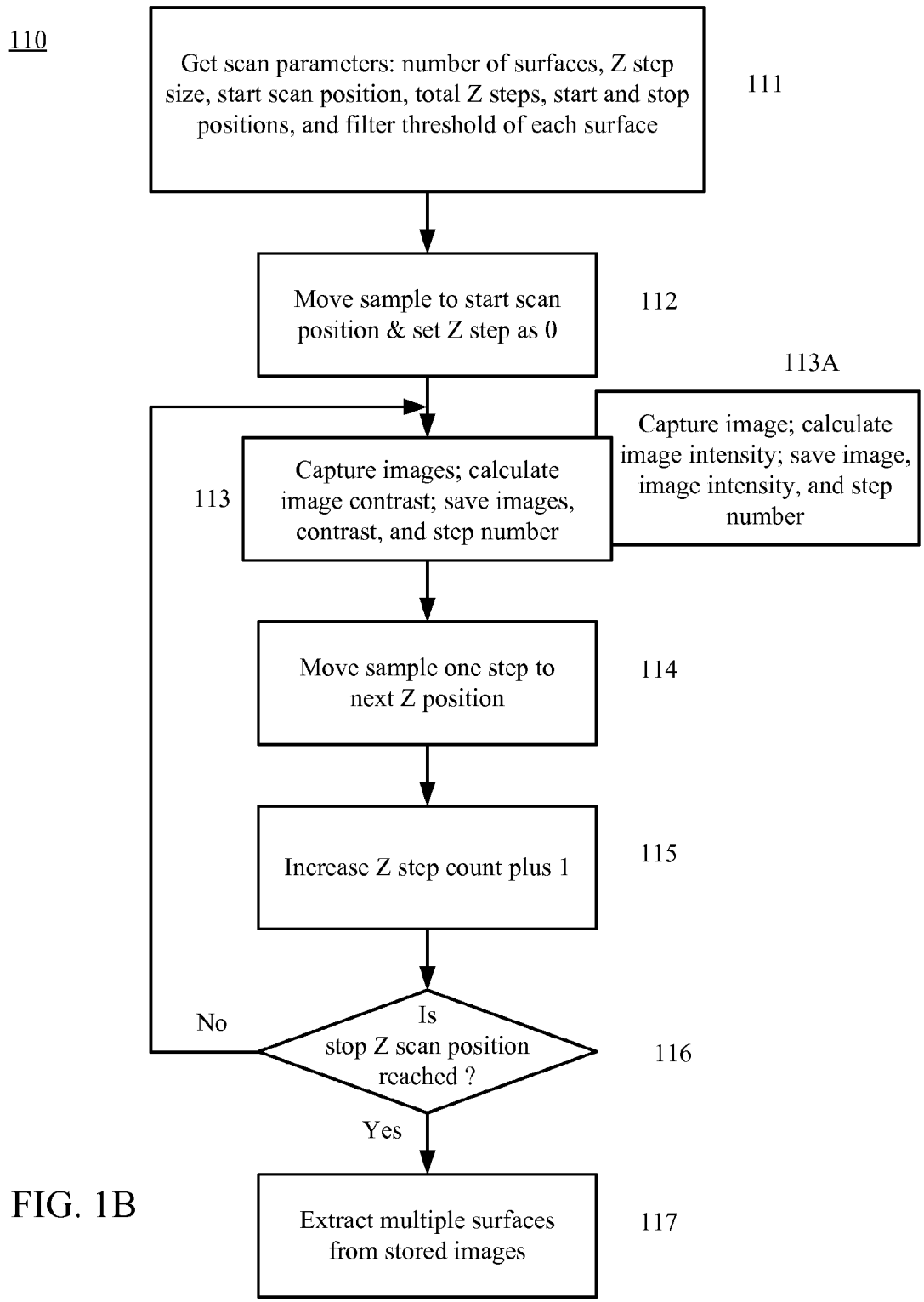
FIG. 1B illustrates an exemplary technique for creating a multi-surface 3D image.

FIG. 1B illustrates an exemplary technique 110 for creating a multi-surface 3D image. In technique 110, step 111 can get the scan parameters needed for the acquisition of a multi-surface 3D image. These parameters can be entered into the imaging system, either through loading of a recipe or by user input. Exemplary parameters can include the number of surfaces, the Z step size, the total Z steps, the start and stop Z scan positions of each surface, and the filter threshold for each surface. Step 112 can move the sample (or, alternatively, the objective) to a start Z scan position, i.e. the Z step set as 0.

Step 113 can use the imaging system to capture two 2D images: one 2D image with the pattern generated by the structured light source, and another 2D image without the pattern while still illuminated. At this point, the imaging system can calculate the image contrast from the patterned image. Both images, the calculated image contrast, and the step number can be stored in memory. Step 114 can move the sample (or the objective) one Z step toward the stop Z scan position. Step 115 can increase the Z step count by 1. Step 116 can determine whether the stop Z scan position is reached. If not, then technique 110 can return to step 113 and perform the corresponding actions at the current Z step. When the stop Z scan position is reached, then step 117 can extract multiple surfaces from the stored images.

In a second embodiment, which uses a confocal imaging system for data acquisition, step 113 can be replaced by step 113A. In this case, the image intensity (not the image contrast) can be calculated and only one image, i.e. the image without the pattern, is saved (not both images).

Figure 2:
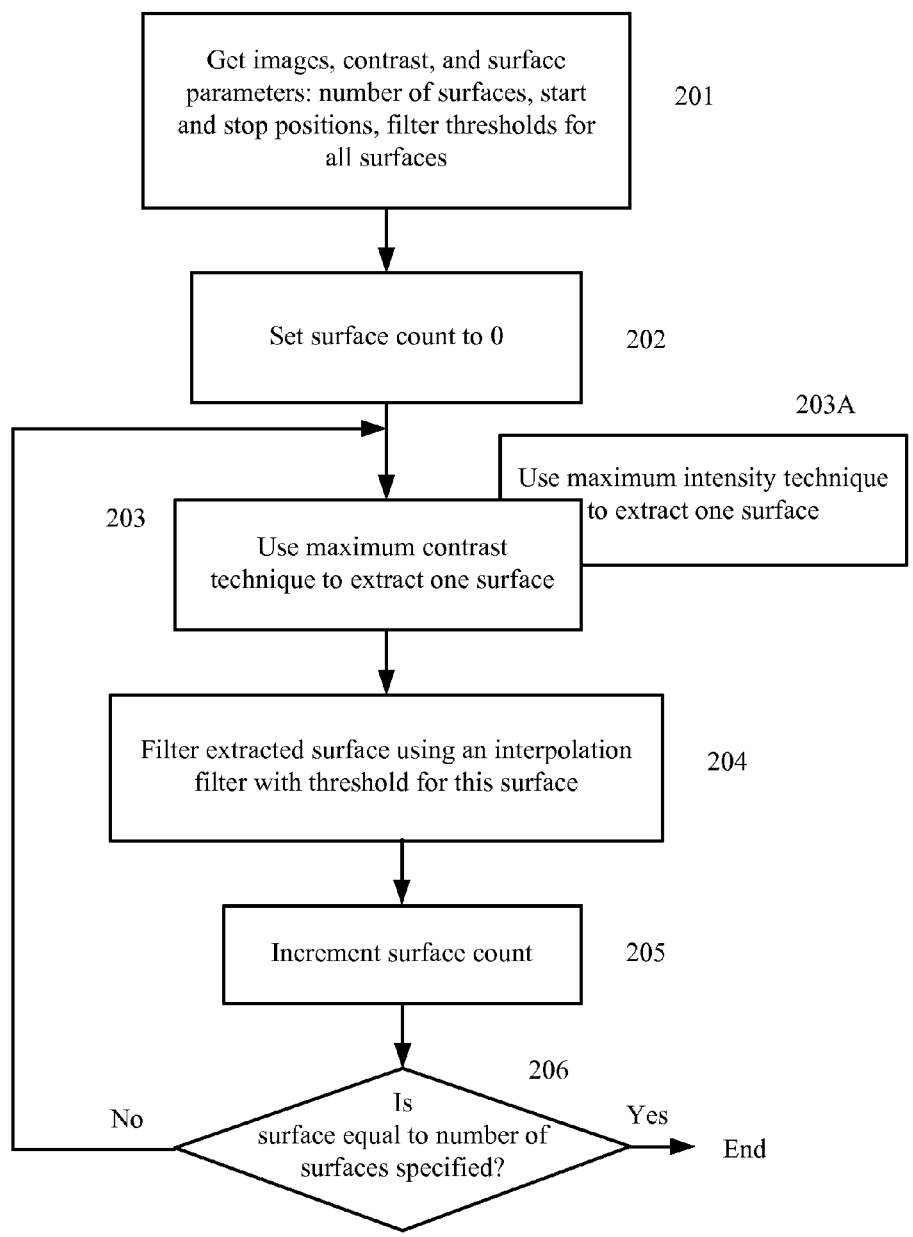
FIG. 2 illustrates an exemplary technique for multiple surface extraction.

FIG. 2 illustrates an exemplary technique for step 117, i.e. multiple surface extraction. Step 201 retrieves the images, contrasts, and surface parameters. Exemplary surface parameters include the number of surfaces, the start and stop positions of each surface, and the filter thresholds for all surfaces. Step 202 sets the surface count to 0. Then, step 203 uses a maximum contrast technique to extract one surface. An exemplary maximum contrast technique is disclosed in U.S. Pat. No. 7,729,049 (Xu). In one embodiment, instead of searching through the entire Z scan range, just the start and stop positions associated with the surface can be used. Note that for a confocal system, step 203A can use a maximum intensity technique instead of the maximum contrast technique. Step 203 can filter the extracted surface using an interpolation filter with a threshold for the surface being extracted (described in further detail below). Step 205 can increment the surface count. Step 206 can determine whether the surface count is equal to the number of surfaces specified in step 201. If not, then the technique can return to step 203. If so, then all specified surfaces have been extracted (end extraction).

In the maximum contrast technique, a clearly visible surface point is one that is associated with a surface data point with consistent Z profile value and high contrast. For the part of the surface that is not clearly visible, the maximum contrast technique produces a noisy Z profile with low contrast surface data points. Because the contrast value of a surface data point relates to the visibility of the surface, it is a measure of confidence for a visible surface. Note that when using the maximum intensity technique, the intensity would be used as the measure of confidence.

In some samples, only part of a valid surface is clearly visible to the system. As a result, the extracted surface will have consistent Z values with high confidence data points where the surface is clearly visible, and noisy Z values with low confidence data points where the surface is not. Notably, the noisy data points are not a good representation of the physical surface. The above-described interpolation filter (step 204) can advantageously fill-in the noisy area to produce a surface that is a better approximation to the physical surface.

Because a physical surface typically changes shape smoothly, the Z value of one data point on a surface gives a good indication of the Z position of its neighbor. As a result, a high confidence surface data point can be used to modify its neighboring low confidence data points to help fill-in, or smooth-out a noisy surface area. Therefore, one step in improving the extracted surface is to identify the high confident surface data points.

Depending on the expected size of the valid surface area as a percentage of the total image area, a predefined layer specific threshold of contrast (or intensity) percentile is used to select the high confidence data points from the extracted data. For example, if the valid surface occupies only 5 percent of the total image area, then data points with a 95 percentile confidence would most likely be within the valid surface area. Setting a threshold of 95 percentile will likely eliminate most data points and select only those within the valid surface area. If there are areas within the physical surface that are not clearly visible, then the data points from those area will have low confidence. However, they might be surrounded by high confidence data points. The interpolation filter can interpolate using such high confidence data points to generate an expected profile value for the low confidence (i.e. below threshold) data points. In doing so, each original noisy, low confidence area can be replaced with a more representative profile value. In general, this replacement results in the contrast (or intensity) values associated with the low confidence data points being raised to that of their neighboring high confidence (or intensity) valid surface data points. As a result, the patchy and noisy extracted surface can be improved to accurately represent the real physical surface.

Figure 3:
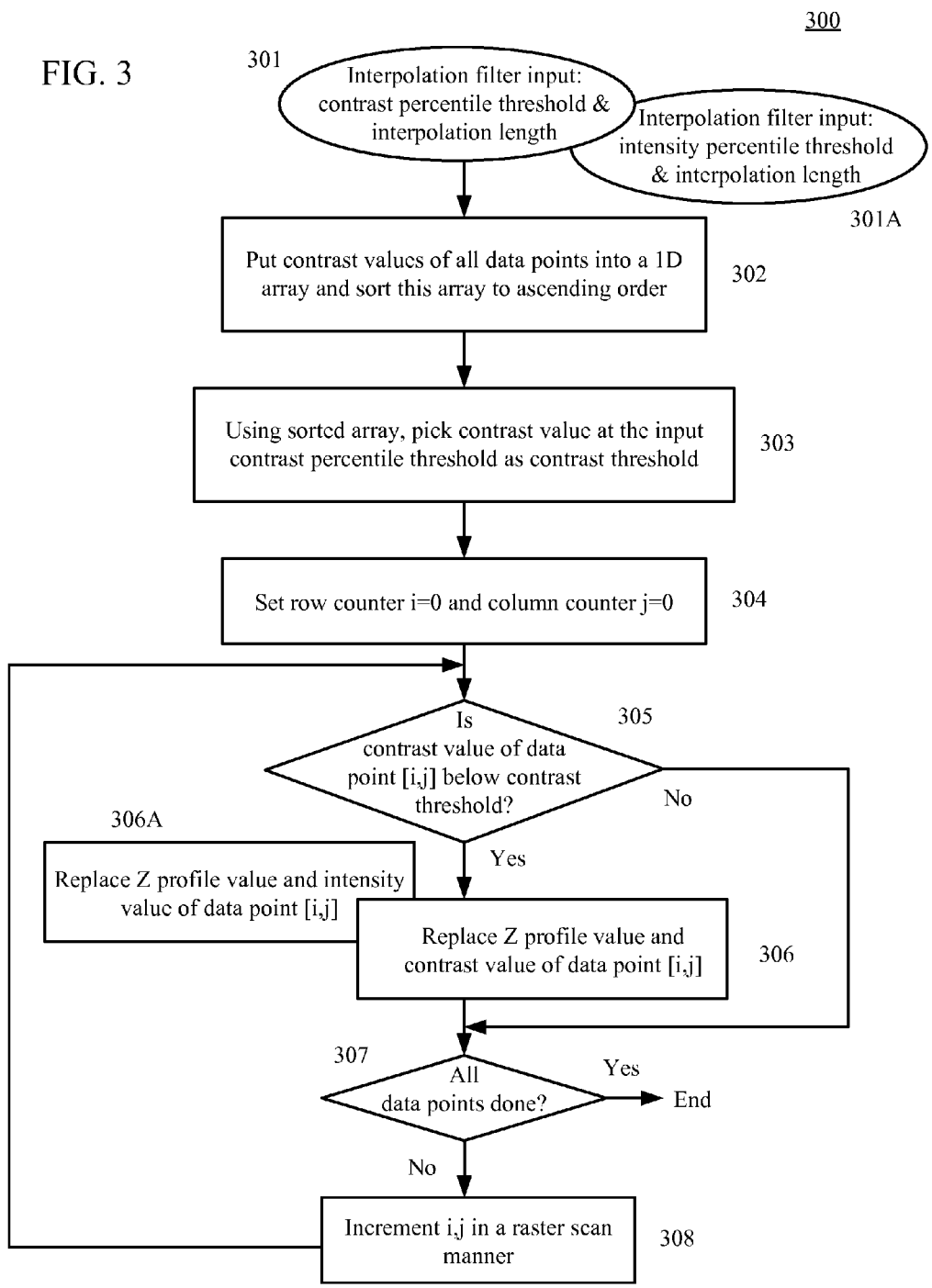
FIG. 3 illustrates an exemplary interpolation technique usable in an interpolation filter.

FIG. 3 illustrates an exemplary interpolation technique 300 usable in the above-described interpolation filter. Inputs 301 for this interpolation filter can include the contrast percentile threshold and the filter length. In general, technique 300 enhances the low confidence data point by leveraging their neighboring high confidence data points.

Step 302 puts the contrast values of all data points into a 1D array and sorts the points in ascending order. Step 303 converts a percentile to a corresponding number of data points that need to be selected out of the total number of data points. Using that number of data points as an index, the contrast threshold is then determined.

Note that other methods of converting percentile value to numeric value can also be used in other embodiments. For example, the histogram method is another choice for the conversion. These methods are within the scope of this invention.

After the contrast threshold is found, the low confidence data points can be separated from the high confidence data points. For each low confidence data point, both its contrast value and the Z profile value can be replaced by the contrast-weighted average of its neighboring high confidence data points. In one embodiment, a neighborhood size of 9 can be used, wherein the high contrast data points within a 9×9 block centering around the low confident data point can be used. In general, a larger block size requires more data processing and results in slower throughput, but provides better results for lower quality images. In one embodiment of step 306, the contrast-weighted average Z profile value Z' can be defined as:

$$Z' = \frac{\sum_{i,j}(Contrast_{ij} \cdot Z_{ij})}{\sum_{i,j} Contrast_{ij}} : Contrast_{ij} > ContrastThreshold$$

where i,j are the indices of each pixel in the neighborhood centering at the current data point. Note that the size of the neighborhood is specified by the predefined filter length.

Step 304 sets the row counter (i=0) and column counter (j=0). Step 305 determines whether the contrast value of the data point [i,j] is below that of the contrast threshold, which was chosen in step 303. If so, then step 306 can update that low confidence data point. During this update, the Z profile value of data point [i,j] can be replaced with the contrast-weighted average profile value using the above formula. Also during the update, the contrast value of data point [i,j] can be replaced with the contrast-weighted average. In one embodiment, the new contrast value Contrast' can be defined as:

$$Contrast' = \frac{\sum_{i,j} Contrast_{ij}}{\sum_{i,j} 1} : Contrast_{ij} > ContrastThreshold$$

Step 307 can determine whether all data points have been reviewed. If not, then step 308 can increment the data point [i,j] in a raster scan manner and return to step 305. Note that when step 305 determines that the contrast value of data point [i,j] is equal to or above the contrast threshold, then technique 300 can proceed directly to step 307 (and skip step 306). If all data points have been reviewed, as determined by step 307, then technique 300 is done.

When a confocal system is used to implement technique 300, inputs 301A for the low confidence data interpolation filter can be the intensity percentile threshold and the filter length. For low confidence data points, both the Z profile value and the intensity value can be replaced (in the case of the intensity value, by the intensity-weighted average of their neighboring high confidence data points) in step 306A.

Note that the resulting extracted multiple surfaces (step 107) can be displayed in various ways and using various hardware and software tools. In one embodiment, each surface can be rendered within the same 3D frame using the computer industry standard OpenGL infrastructure. Other infrastructures such as Microsoft's Direct3D and other computer display software package can also be used.

Because each surface is extracted from the 2D image stack taken from a single Z scan, its relative Z position reflects the sample's physical structure. In accordance with one exemplary display, from the bottom surface and up, each of the multiple surfaces can be rendered with an opacity value. These opacity values are adjustable so that any surface can either be seen, highlighted, or hidden. Due to the fast rendering speed of above-described multiple surface extraction, the opacity of the rendered surfaces can be adjusted interactively.

Using a conventional method, an image of an extracted internal surface of an object usually covers the whole image area. Unfortunately, if the internal surface does not physically cover the whole image area, then the extracted surface image may contain large amounts of false data made of noise.

To solve this problem, a multi-surface 3D image display method can filter out false data points. In the first embodiment described above, the surfaces are extracted using the maximum contrast method, and contrast is used as a measure of confidence in determining a valid surface data point. In the second embodiment described above using a confocal based system, the intensity is used as the measure of confidence. By using a contrast (or intensity) filter to determine whether to render a surface data point, an analysis system can correctly display a surface that only covers part of an image area. Because the rendering speed of the multi-surface imaging system is in real time, the selective rendering can be done interactively, thereby allowing a user to interactively set a contrast (intensity) filter while watching the surface being rendered.

Figure 4:
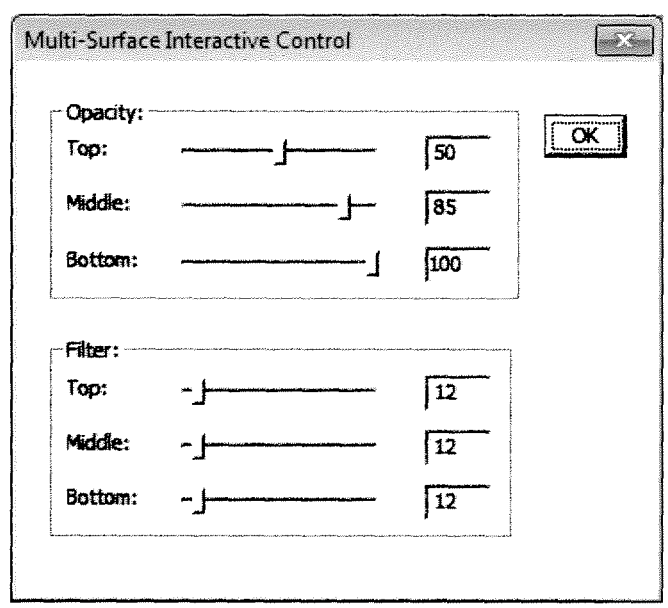
FIG. 4 illustrates an exemplary interactive user interface to control the opacity and filter.

FIG. 4 illustrates an exemplary interactive user interface 400 to control the opacity and filter. In this example, the multi-surface 3D image has three surfaces. Therefore, three opacity and contrast (or intensity) filter slider bars can be provided, one pair for each surface. Each opacity slider bar can control the visibility of each surface while each contrast (or intensity) filter slider bar can determine the rendering area on each extracted surface. It is understood that the number of opacity and contrast/intensity slider bars provided in interface 400 can be modified for any number of surfaces, i.e. with fewer surfaces and with more surfaces.

Figure 5:
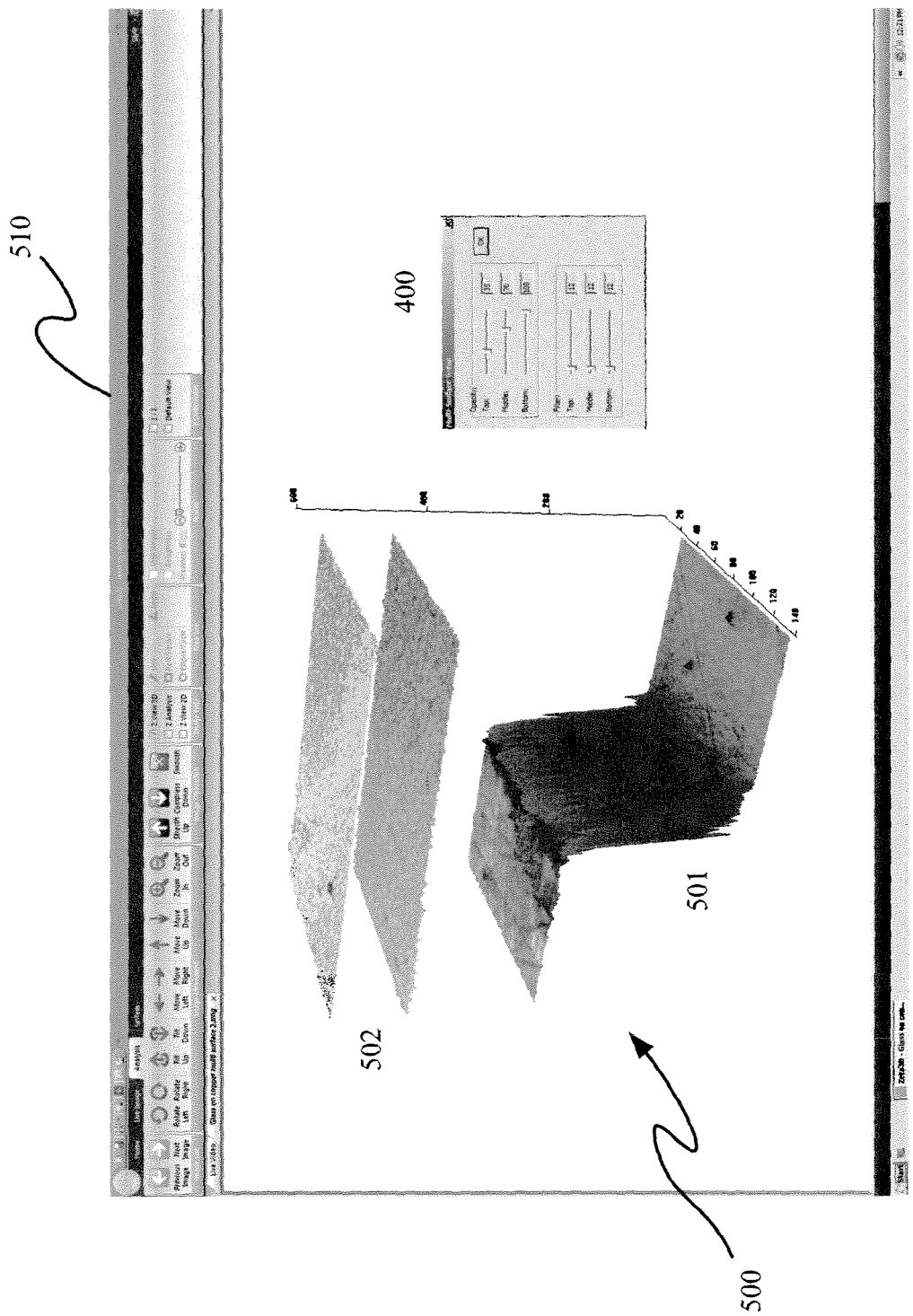
FIG. 5 illustrates an exemplary screen shot of a rendering of a multi-surface 3D object.

FIG. 5 illustrates an exemplary screen shot 510 of a rendering of a multi-surface 3D object. The object has a step structure 501 (e.g. copper) covered by a thin glass plate 502. Thus, there are three surfaces involved, i.e. the top and bottom surfaces of the glass plate, and the surface of the copper step. Notice that dark colored contaminants on the top glass surface and copper surface are clearly visible. In one embodiment, screen shot 510 can also include interactive user interface 400 (FIG. 4) for user convenience.

Although rendering a multi-surface in 3D gives an overall view of a sample's internal structure, a quantitative measurement of the structure is lacking. Note that in a conventional one-surface cross sectional view, a single profile is displayed on a two dimensional chart where the x-axis shows the horizontal span and the y-axis shows the vertical span. In the multi-surface 3D image, this presents a challenge because for every x-axis position there can be multiple values for the y-axis (each value on the y-axis represents the location of a surface).

Figure 6:
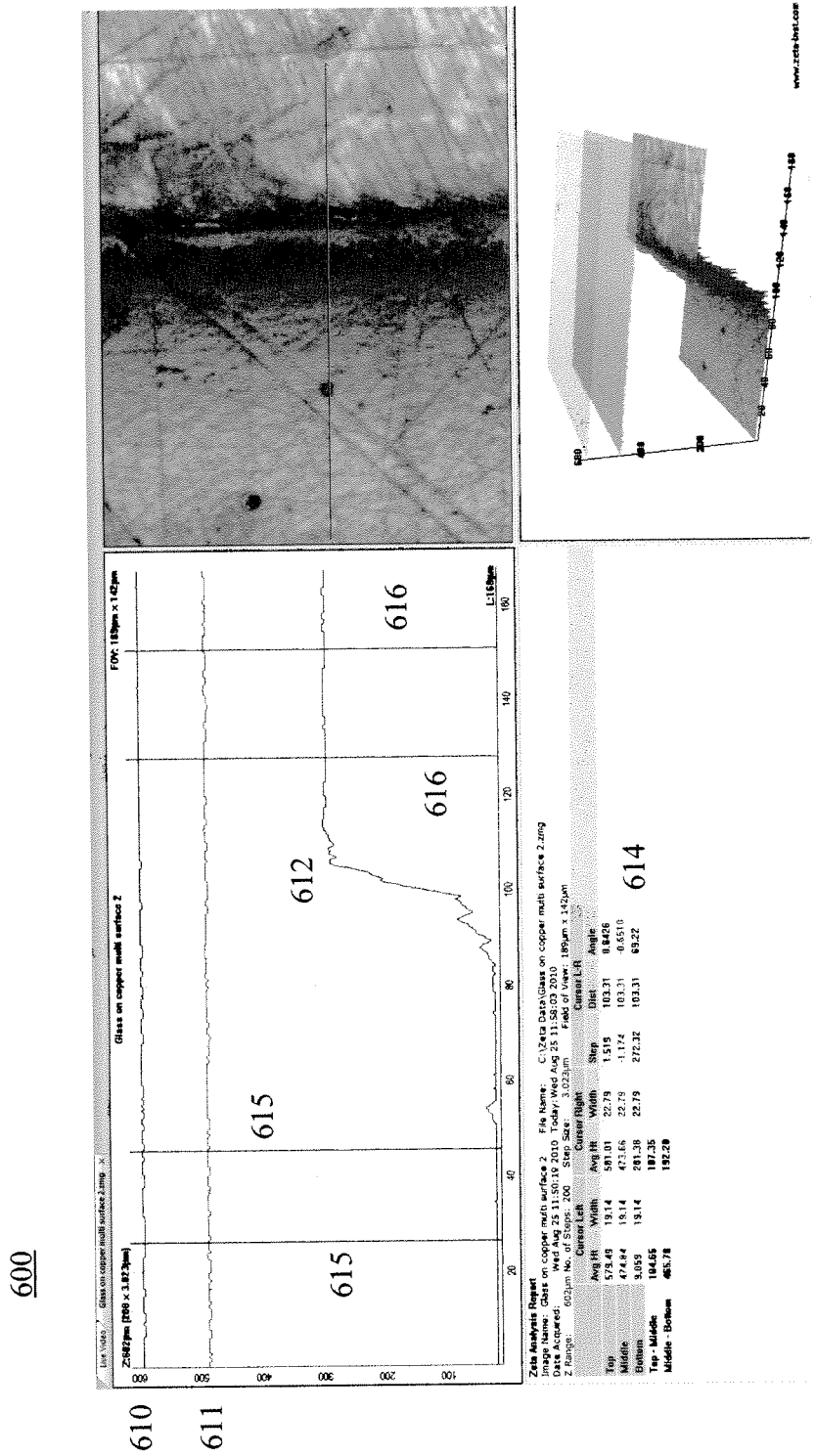
FIG. 6 illustrates a screen shot of exemplary, displayed profiles associated with multiple object layers. The profiles are simultaneously displayed on a single x-y plot, which includes interactive cursors for determining the display of various layer results.

To solve this problem, the cross sectional profile for each of the surfaces can be simultaneously displayed in a single x-y plot. For example, if 3 surfaces on the 3D image are provided, then 3 profiles corresponding to the 3 surfaces can be displayed. FIG. 6 illustrates an exemplary screen shot 600 of profiles 610, 611, and 612, wherein profile 610 corresponds to a top surface, profile 611 corresponds to a middle surface, and profile 612 corresponds to a bottom surface. Because each surface represents a distinct physical layer in the original object, the distance between profiles 610 and 611 within the same cross-sectional display represents the apparent thickness of the top layer or the apparent distance between the top and middle surfaces as measured by the 3D imaging system. Since most industrial samples are measured in ambient environment (i.e. in air), if the index of refraction $n_1$ of the top layer is known, then the actual thickness of the top layer or the distance between the top and middle surfaces can be computed as follow:

$$\text{Actual thickness of top layer} = \text{Apparent thickness of top layer} \times \tan[\arcsin(NA)]/\tan[\arcsin(NA/n_1)]$$

where NA is the numerical aperture of the microscope objective lens used in imaging.

Conversely, if the thickness of the top layer is known, then the index of refraction of the top layer can be calculated from the measured apparent thickness value. The thickness of other layers can be computed in a similar manner.

In addition to thickness measurement, other geometric parameters of every displayed surface can be measured as well. Exemplary parameters can include surface curvature, roughness, waviness, etc. Screen shot 600 can further include a table 614. Table 614 can include one or more parameter results of each layer having a profile. Notably, these results can be modified based on the position of two pairs of cursors: cursor pair 615 and cursor pair 616. Each pair of cursors (i.e. 615 or 616) can be an interactive cursor position by a user. The cursor pair 615 generates the Cursor Left entries in table 614, whereas the cursor pair 616 generates the Cursor Right entries in table 614. Each cursor pair can calculate/generate the average height of the profile as well as the width/length in between the member cursors of the cursor pair (i.e, the left cursor of cursor pair 615 and the right cursor of cursor pair 615.)

Note that a surface may not include the whole span of a cross section. In that case, a portion of each profile may be left blank because no corresponding physical layer exists. This missing data presents an issue when the distance between two such profiles is measured. One solution is to disregard the missing data and only provide distance data at locations where both profiles are available.

The embodiments described herein are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method of measuring multiple surfaces of an object, the method comprising:

using an imaging system to acquire a plurality of two-dimensional (2D) images of the object at a corresponding plurality of scan positions;

extracting multiple surfaces of the object from the plurality of 2D images, wherein each of the multiple surfaces represents a distinct physical layer of the object;

selecting a plurality of cross-sectional profiles, wherein each of the cross-sectional profiles represents a different one of the extracted multiple surfaces of the object;

correcting at least one of the plurality of cross-sectional profiles based on a known characteristic of the object, thereby providing a corrected plurality of cross-sectional profiles;

calculating parameters of the object based on at least one of the corrected plurality of cross-sectional profiles; and simultaneously displaying the corrected plurality of cross-sectional profiles using a single x-y plot; and displaying the calculated parameters.

2. The method of claim 1, wherein the correcting includes converting an apparent thickness of a layer associated with a pair of the cross-sectional profiles into an actual thickness.

3. The method of claim 2, wherein the correcting computes the actual thickness by multiplying the apparent thickness by a function of an index of refraction of the layer and numerical aperture of an objective lens.

4. The method of claim 1, wherein the parameters include at least two of surface thickness, curvature, roughness, and waviness.

5. The method of claim 1, wherein the displaying includes:
selecting a first section of the corrected plurality of cross-sectional profiles on the x-y plot; and
selecting a second section of the corrected plurality of cross sectional profiles on the x-y plot.

6. The method of claim 5, wherein the displaying further includes:
calculating a first set of values based on the corrected plurality of cross-sectional profiles in the first section;
calculating a second set of values based on the corrected plurality of cross-sectional profiles in the second section; and
displaying the first set of values and the second set of values as the calculated parameters.

7. The method of claim 1, wherein the correcting includes:
determining an apparent thickness of a layer defined by a pair of the cross-sectional profiles by determining a distance between the cross-sectional profiles; and
determining an actual thickness of the layer based on the apparent thickness of the layer and an index of refraction of the layer.

8. The method of claim 7, wherein determining the actual thickness of the layer is further based on a numerical aperture of an objective lens used to determine the pair of cross-sectional profiles.

9. The method of claim 8, wherein the actual thickness of the layer is determined to be the apparent thickness of the layer times tan [arcsin(NA)]/tan [arcsin(NA/$n_1$)], wherein NA is the numerical aperture of the objective lens used to identify the pair of cross-sectional profiles, and $n_1$ is the index of refraction of the layer.

10. The method of claim 1, wherein the 2D images comprise image contrast values, wherein contrast is used as a measure of confidence in determining valid surface data points of each of the surfaces of the object.

11. The method of claim 1, wherein the 2D images comprise image intensity values, wherein intensity is used as a measure of confidence in determining a valid surface data points of each of the surfaces of the object.

* * * * *